United States Patent
Bhatia

[19]

[11] Patent Number: 5,880,929
[45] Date of Patent: Mar. 9, 1999

[54] HEAT EXCHANGER SYSTEM FOR COOLING A HINGED COMPUTING DEVICE

[75] Inventor: Rakesh Bhatia, San Jose, Calif.

[73] Assignee: Intel Corporation, Santa Clara, Calif.

[21] Appl. No.: 980,704

[22] Filed: Dec. 1, 1997

[51] Int. Cl.[6] .................................. G06F 1/20; H05K 7/20
[52] U.S. Cl. ...................... 361/687; 165/86; 165/104.33; 361/700; 174/15.2
[58] Field of Search ..................... 361/687–699, 361/700, 704, 707, 717–719; 165/104.33, 86; 174/15.2; 364/708.1; G06F 1/20

[56] References Cited

U.S. PATENT DOCUMENTS

| | | | |
|---|---|---|---|
| 5,129,448 | 7/1992 | Holmberg, Jr. ........................... | 165/86 |
| 5,313,362 | 5/1994 | Hatada et al. ........................... | 361/709 |
| 5,383,340 | 1/1995 | Larson et al. ........................... | 361/700 |
| 5,621,613 | 4/1997 | Haley et al. ........................... | 361/687 |
| 5,646,822 | 7/1997 | Bhatia et al. ........................... | 361/687 |

FOREIGN PATENT DOCUMENTS 702 287 A2  3/1996  European Pat. Off. .

*Primary Examiner*—Lynn D. Feild
*Attorney, Agent, or Firm*—Arnold White & Durkee P.C.

[57] ABSTRACT

A heat exchanger system for use in a hinged computing device is provided. The hinged computing device includes a base housing connected to a display housing by one or more hinges. A number of heat generating electronic components are located within the base housing, and a display screen is positioned in the display housing. The heat exchanger system includes a heat pipe located in the base and thermally coupled to both an electronic component and the hinge to allow heat transfer from the electronic component to the hinge. A flat plate heat pipe located in the display housing is mechanically and thermally coupled to the hinge to allow heat transfer from the hinge to the flat plate heat pipe for dissipation through the display housing.

15 Claims, 4 Drawing Sheets

HEAT EXCHANGER SYSTEM FOR COOLING A HINGED COMPUTING DEVICE

BACKGROUND OF THE INVENTION

1. Field of the Invention

This invention relates generally to the removal of heat from electronic components, and more particularly, to the removal of heat from a first computing device housing member to a rotatably attached second computing device housing member.

2. Description of the Related Art

Higher levels of integration and improved processing technology produce increasingly complex integrated circuits. These new generations of integrated circuits often operate at higher frequencies and generate more heat than their predecessors. These thermal problems are compounded by increasing power (and therefore increasing heat generation) from microprocessors, increasing power from other components (e.g., graphics and memory), and by reductions in the form factor of computing devices (e.g., the move toward thinner and lighter notebook computers). Typically, heat sinks, fans, and heat pipes are employed to dissipate heat from integrated circuits and other electronic components. Increases in heat generation are often accompanied by simply increasing the quantity or size of these heat dissipation elements. The relatively small size of a portable computing device, however, complicates heat dissipation by limiting airflow, crowding heat generating components, and reducing the space available for heat dissipation devices.

A portable computing device typically includes two computer housing members that are rotatably coupled by a hinge. The first member, a computer base, usually has an input device such as a keyboard or a touchpad as well as a number of electronic components. Integrated circuits with the highest clock frequency are typically located in close proximity to each other within the computer base. Accordingly, there is a region in the base having a level of heat generation greater than that of the rest of the computing device.

Since the computer base size is generally kept to a minimum, and the computer base contains both the input device and numerous other electronic components, there may be inadequate space to dissipate enough heat to keep the electronic components within their acceptable range of operating temperatures. Heat dissipation through the bottom of the base is limited because the computer is usually operated on a relatively flat surface. Also, the input device (e.g. keyboard) can limit the heat flow through the top of the base. The traditional horizontal operating position adds to the difficulty of dissipating heat from the computer base when the lid of the notebook is closed, an operating position that arises when the computer is docked or a port replicator is used.

The second member, a computer display, is typically in a substantially vertical position during computer operation. The display contains an output device, such as a screen, and some additional computer circuitry. In most computing devices, the screen and the other circuitry in the display do not generate more heat than can be dissipated given the surface area available and the relatively vertical position of the display. Thus, additional heat from the base could be dissipated in the display if transferred from the base to the display.

The main difficulty in transferring heat between the base and the display is that many efficient heat conductors, such as heat pipes, are not sufficiently flexible to accommodate the repetitive motion expected between the hinged base and display of the computing device. Efforts have been made to otherwise connect a heat pipe from the base of a computing device to a heat pipe in the display. One such effort is discussed in U.S. Pat. No. 5,646,822, which is assigned to the present assignee. The mating of heat pipes described in the '822 patent requires a connector or a thermal hinge to be added between the base and display of the computing device. Connecting one heat pipe to another at a hinge is mechanically complex. Assembly and disassembly of the computing device (e.g. for servicing in the field) is further complicated by the pipe-to-pipe connection at the hinge.

The present invention is directed to overcoming, or at least reducing the effects of, one or more of the problems set forth above.

SUMMARY OF THE INVENTION

In one aspect of the present invention, a heat exchanger system is provided for transferring heat generated by an electronic component located in a first part of a computing device to a second part thereof for dissipation into the surrounding environment. A hinge is used to couple the first part of the computing device to the second part. The heat exchanger comprises a heat pipe located in the first part of the computing device and a flat plate heat pipe located in the second part of the computing device. The heat pipe is thermally coupled to both the electronic component and the hinge. The flat plate heat pipe is mechanically and thermally coupled to the hinge.

According to another aspect of the present invention, a hinged computing device is provided. The hinged computing device includes a first housing having a first edge and containing an electronic component, a second housing having a second edge, and a hinge coupling the first edge to the second edge. The hinge allows for hinging motion between the first housing and the second housing. A heat pipe is located in the first housing and is thermally coupled to both the electronic component and hinge to allow heat transfer between the electronic component and hinge. A flat plate heat pipe is located in the display housing, and is mechanically and thermally coupled to the hinge to allow heat transfer between the hinge and the flat plate heat pipe.

BRIEF DESCRIPTION OF THE DRAWINGS

Other objects and advantages of the invention will become apparent upon reading the following detailed description and upon reference to the drawings in which.

Figure 1:
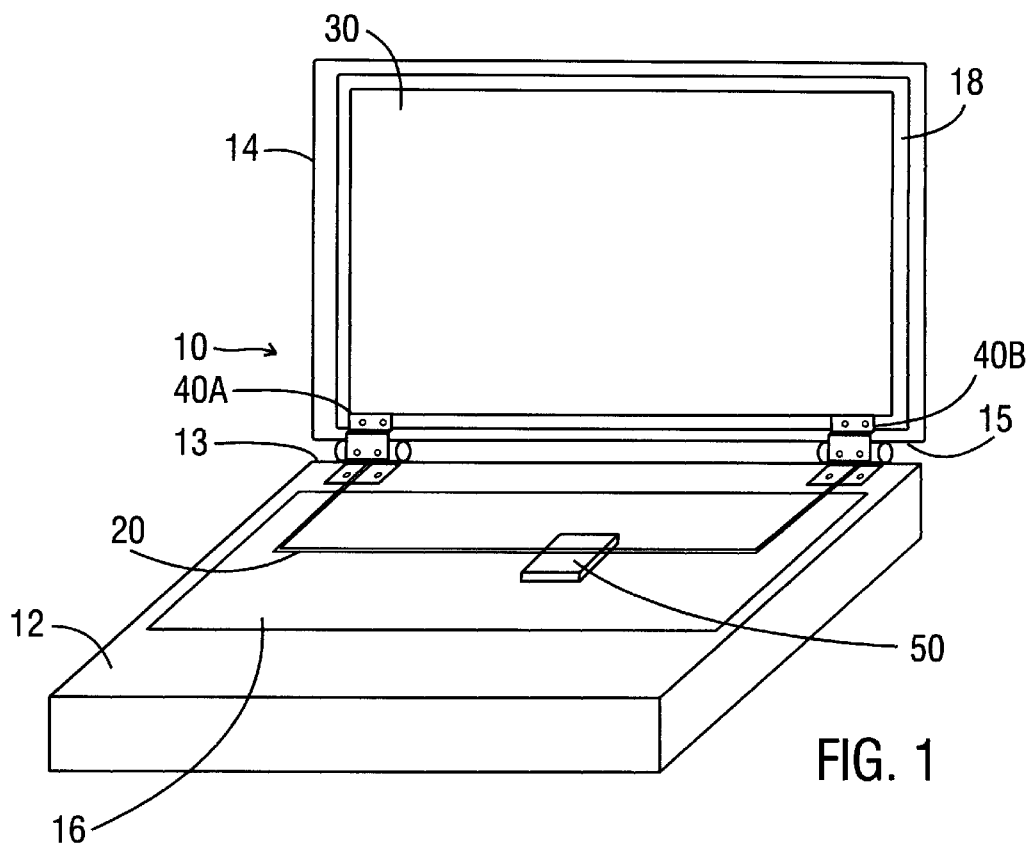
FIG. 1 is a front perspective view of a hinged computing device and the heat exchange system according to an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention describes a technique and apparatus for dissipating heat from electronic components in a base of a computing device into the display housing. This results in a cost efficient, low weight, mechanically simple and thermally efficient system. The performance of fan-less (passive) designs in notebook computers is therefore maximized, which will allow high power microprocessors to be used in such environments.

The present disclosure describes a heat exchanger system for cooling a hinged computing device 10. FIG. 1 shows one such hinged computing device 10 and illustrates an embodiment of the heat exchanger system. In FIG. 1, the heat exchanger system shown includes a heat pipe 20 located in a first part 12 of the computing device 10, and a flat plate heat pipe 30 located in a second part 14 of the computing device 10. The heat pipe 20 is thermally coupled to an electronic component 50 in the first part 12 of the computing device 10. The heat pipe 20 is also thermally coupled to a hinge 40, which rotatably couples the first and second parts 12, 14 of the computing device 10 together. The flat plate heat pipe 30 is mechanically and thermally coupled to the hinge 40. Details of the heat pipe 20 and flat plate heat pipe 30 are shown in FIGS. 4 and 5, respectively.

FIG. 1 illustrates a hinged computing device 10 according to one aspect of the present invention. The hinged computing device 10 may be a laptop or notebook computer, an organizer, or a personal digital assistant. The hinged computing device 10 comprises the first housing member 12 having a first edge 13 and the second housing member 14 having a second edge 15. The first and second housing members 12, 14 are rotatably attached along the first and second edges 13, 15 by the hinge 40. FIG. 1 shows two hinges 40a, 40b being used, which is common in notebook computers. Use of a single hinge, or multiple hinges is also contemplated. The first housing member 12 may be a base housing member that houses the electronic components and input devices, such as the keyboard 16, of the computing device 10, and the second housing member 14 may be a display housing for holding a display screen.

The base member 12 houses a number of heat generating electronic components (for example graphics and memory chips), including a Central Processing Unit (CPU) 50. The heat generated by these components must be removed from the area of the base 12 to prevent damage to the components from overheating. This heat can be removed by thermally coupling the heat pipe 20 to one or more of the electronic components, such as the CPU 50, in the base 12. The ends of the heat pipe 20 are thermally coupled to the hinges 40a, 40b to effectively transfer heat from the electronic components to the hinges 40.

Figure 4:
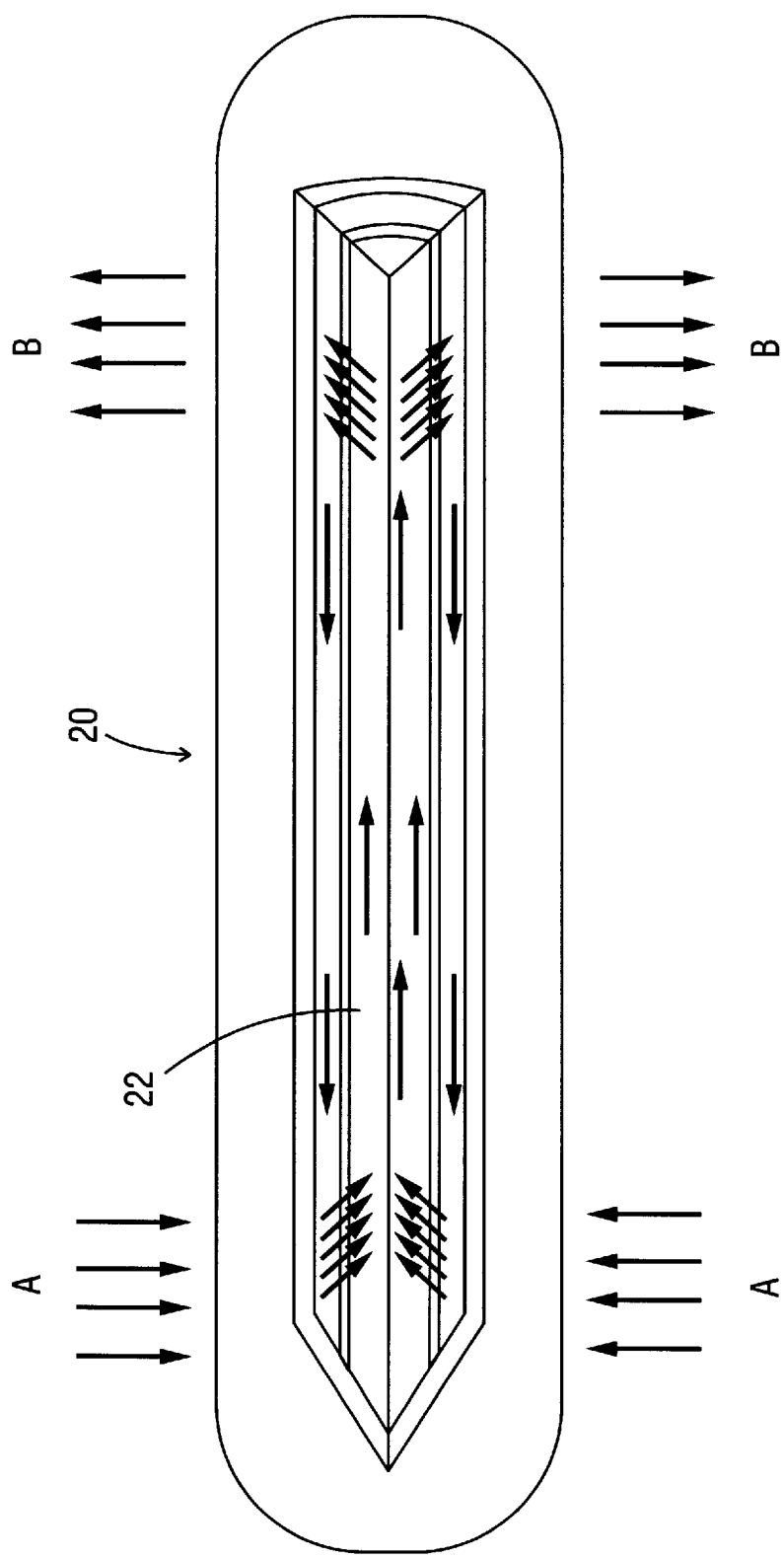
FIG. 4 is a schematic of a round cross-section heat pipe for use in an embodiment of the present invention.
Figure 5:
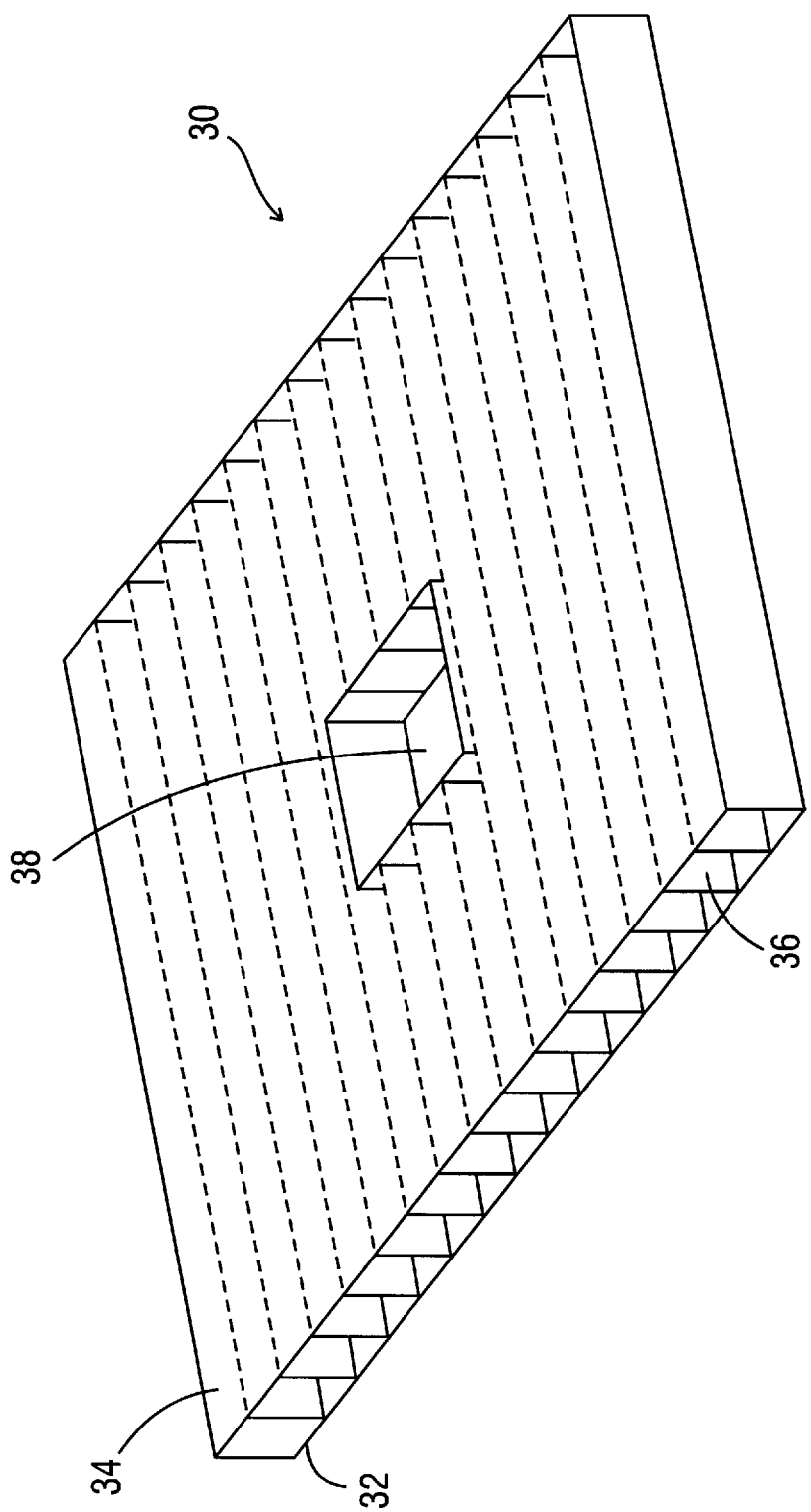
FIG. 5 is a schematic a flat plate heat pipe with an optional square through-hole in the middle for use in an embodiment of the present invention.

The manner in which heat is transferred from the electronic components to the hinges 40 is best described in reference to FIG. 4. The heat pipe 20 shown in FIG. 4 has a round cross-section, which is the most popular structure currently used industrially. Heat pipes with other geometric cross-sections are also contemplated. The heat pipe 20 transfers heat from one location A to another location B very efficiently with equivalent thermal conductivities exceeding 10,000 W/m-K. The working fluid (water or other liquid) vaporizes at the heat source end A, which in FIG. 1 is adjacent the CPU 50. The working fluid then travels through a hollow interior core, or wick 22, of the heat pipe 20, and condenses at the heat sink end B, which in FIG. 1 is at the hinges 40a, 40b. The condensed liquid is then returned to the heat source end A by the capillary forces arising from the wick structure 22.

Referring again to FIG. 1, the display housing 14 includes a display 18, such as an LCD screen, and the flat plate heat pipe 30 is positioned between the display 18 and housing 14. The thickness of the plastic display housing in many current notebook computer applications is typically between 1 and 2 mm. With the addition of the flat plate heat pipe 30, the thickness of the plastic display housing can be reduced to between about 0.5 and 1.5 mm.

Since the available area for heat dissipation equals the area of the display housing 14, it is relatively large. Thus, the plastic temperature behind the display needs to be raised over the ambient temperature by a small amount. For example, a flat heat pipe that is 10° C. over ambient temperature can dissipate 8 W of power generated by the CPU 50 and transferred to the flat plate heat pipe 30 through the heat pipe 20 and the hinge 40. Thus, the placement of the flat plate heat pipe 30 adjacent the plastic display housing 14 has a negligible effect on the thin film transistor (TFT) life.

As best shown in FIG. 5, the flat plate heat pipe 30 according to one aspect of the present invention includes first and second thin flat plates 32, 34 bonded together, such as by roll bonding. A wick structure 36 is sandwiched between the two plates 32, 34. An optional hole 38 may be cut in any location of the flat plate heat pipe 30 to provide clearance for any components that may be present. The flat plate heat pipe 30 may alternatively be formed by direct extrusion of a rectangular cross-section with a wick structure (not shown) or by combining an array of small heat pipes. Any of a variety of types of wick structures, such as machined grooves, etched channels, screens, wires, etc., can be employed.

A flat plate heat pipe 30 is mechanically more rigid than other heat exchange structures of the same material thickness due to the bonding of the first and second thin flat plates 32, 34 forming the heat pipe 30. The flat plate heat pipe 30 may be formed from any lightweight, thermally conductive metal, such as aluminum.

Figure 3:
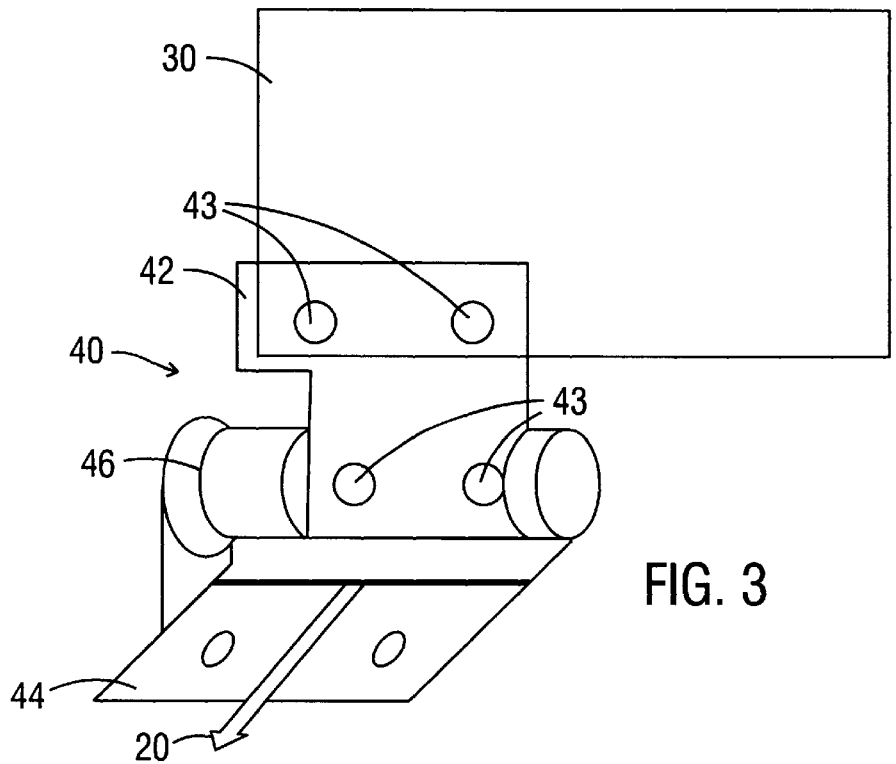
FIG. 3 is an enlarged view of one of the hinge assemblies shown in FIG. 1.
Figure 2A:
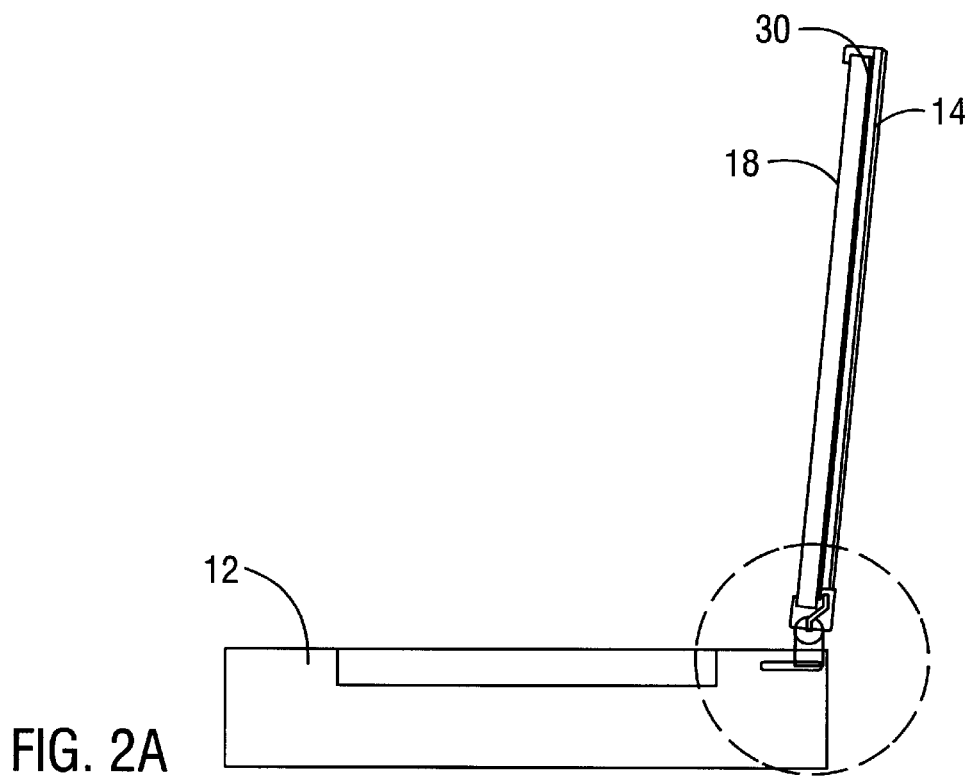
FIG. 2A is a side view of the hinged computing device and the heat exchange system shown in FIG. 1.
Figure 2B:
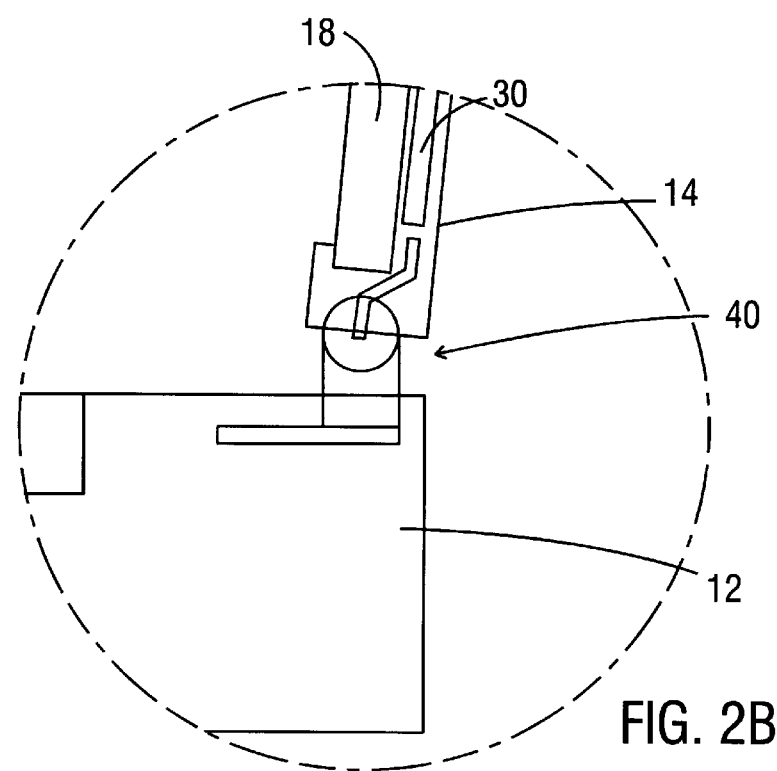
FIG. 2B is an enlarged side view of the hinge assembly shown in FIG. 2A.

The flat plate heat pipe 30 is mechanically and thermally connected to the hinges 40a, 40b that couple the base 12 to the display housing 14. The hinges 40a, 40b not only allow rotational motion between the base 12 and display housing 14, but also transfer heat between the heat pipe 20 and flat plate heat pipe 30. FIG. 3 shows the details of the mechanical hinge 40 according to one aspect of the invention. Hinge configurations other than that shown in FIG. 3 are contemplated. Because of the relatively large area for heat dissipation at the display housing 14, the hinges 40a, 40b are not required to have an unreasonably small thermal resistance. The hinges may be made of any metallic material that is a reasonably good thermal conductor, such as steel, brass, aluminum, an alloy, or the like.

As shown in FIG. 3, the hinge 40 includes a top half 42 that is mechanically and thermally coupled to the flat plate heat pipe 30. Fasteners, such as screws or pins 43, can be used to mechanically connect the top hinge half 42 to the flat plate heat pipe 30. A bottom half 44 of the hinge 40 is thermally coupled to an end of the heat pipe 20. The connection between the end of the heat pipe 20 and the hinge 40 may be made by conventional means. For example, a plate may be connected to the end of the heat pipe 20 by welding and a surface of the plate may be placed into engaging contact with a surface of the bottom half 44 of the hinge 40. The plate may be fastened to be bottom half of the hinge by conventional means, such as by welding or removable fasteners. The top hinge half 42 and bottom hinge half 44 are pivotally connected to one another by a pivot pin 46. The pivot pin 46 is constructed and connected to the top and bottom halves of the hinge so that thermal conductivity from the bottom half 44 to the top half 42 remains within acceptable limits.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A heat exchanger system for transferring heat generated by an electronic component located in a first part of a computing device to a second part thereof for dissipation into the surrounding environment, said first part of the computing device being coupled to said second part by a thermally conductive hinge having a first hinge section and a second hinge section, said heat exchanger system comprising:
   a heat pipe located in the first part of the computing device and thermally coupled between the electronic component and the first hinge section; and
   a flat plate heat pipe located in the second part of the computing device, said flat plate heat pipe being thermally coupled to the second hinge section.

2. The heat exchanger system according to claim 1, wherein the heat pipe exhibits a round cross-section.

3. The heat exchanger system according to claim 1, wherein the flat plate heat pipe is formed from aluminum.

4. The heat exchanger system according to claim 1, wherein the thermally conductive hinge comprises two thermally conductive hinges, each connected to an end of the heat pipe.

5. The heat exchanger system according to claim 4, wherein the electronic component is thermally coupled to the heat pipe at a position between the ends of the heat pipe.

6. A hinged computing device, comprising:
   a first housing member having a first edge and containing an electronic component;
   a second housing having a second edge;
   a thermally conductive hinge including a first hinge section coupled to the first edge and a second hinge section coupled to the second edge allowing pivotal motion between the first housing and the second housing;
   a heat pipe located in the first housing and thermally coupled to both the electronic component and said first hinge section to allow heat transfer between the electronic component and said first hinge section; and
   a flat plate heat pipe located in the second housing, said flat plat heat pipe being mechanically and thermally coupled to the second hinge section to allow heat transfer between the second hinge section and the flat plate heat pipe.

7. The hinged computing device according to claim 6, wherein the first housing is a base housing and the second housing is a display housing.

8. The hinged computing device according to claim 7, wherein a display screen is housed in the display housing, said flat plate heat pipe being positioned within the display housing between the screen and an outer cover of the display housing.

9. The hinged computing device according to claim 8, wherein the display screen is a liquid crystal display screen.

10. The hinged computing device according to claim 7, wherein the computing device is a notebook computer.

11. The hinged computing device according to claim 6, wherein the heat pipe exhibits a round cross-section.

12. The hinged computing device according to claim 6, wherein the flat plate heat pipe is formed from aluminum.

13. The hinged computing device according to claim 6, wherein the thermally conductive hinge comprises two thermally conductive hinges, each connected to an end of the heat pipe.

14. The hinged computing device according to claim 13, wherein the electronic component is thermally coupled to the heat pipe at a position between the ends of the heat pipe.

15. The hinged computing device according to claim 6, wherein the electronic component is a central processing unit.

* * * * *